April 24, 1956  R. McVAY  2,742,729
FISH LURE
Filed Jan. 22, 1954
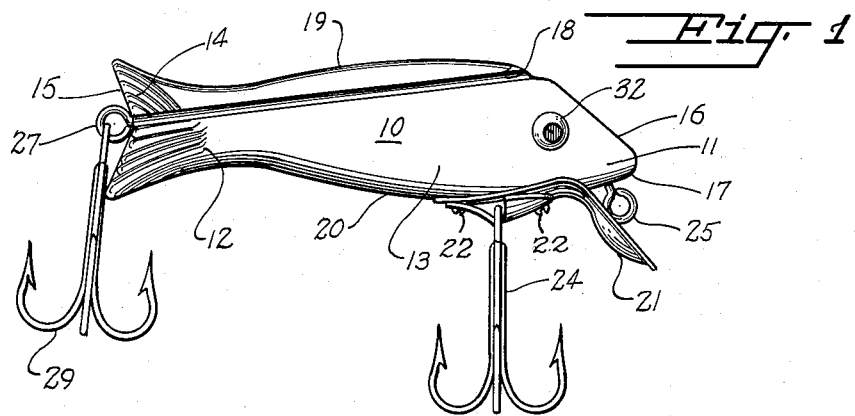
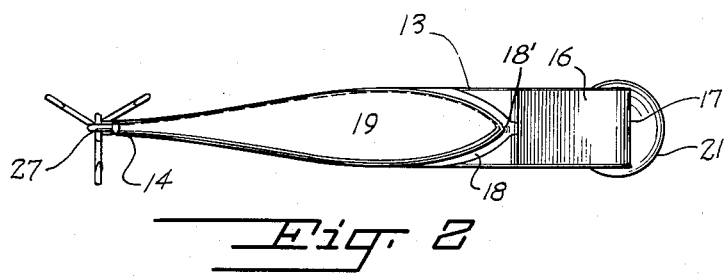
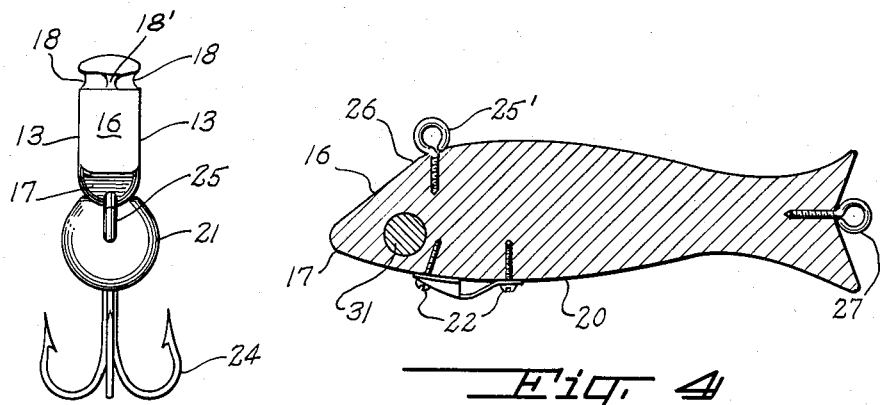
INVENTOR.
Raymon McVay
BY
McMorrow, Berman + Davidson
ATTORNEYS

United States Patent Office 2,742,729
Patented Apr. 24, 1956

2,742,729

FISH LURE

Raymon McVay, Denison, Tex.

Application January 22, 1954, Serial No. 405,534

3 Claims. (Cl. 43—42.48)

This invention relates to improvements in artificial lures for casting and troll fishing.

Many forms of artificial lures are presently in use and all are designed to simulate a live bait as closely as is possible in order that predatory fish are misled into striking at and attempting to catch the bait. Many forms and designs have been perfected in order that the lures have a swimming action as it is being dragged through the water. Some lures employ hollowed faces to entrap air or water; others have shifting weights to cause an erratic path in the water; certain others have specific shapes to the body of the lure in order that water passing over the shaped sides effects desired and calculated performance.

The present invention is one of the latter type. It depends on a particular body shape and design for its action in the water resembling a small fish trying to escape an enemy. The shape of the body causes water to flow upwards from a forwardly slanting face and rearwardly along grooves cut deeply into the sides of the body along the upper margin of straight sides where the sides meet the top or dorsal portion. The water flowing along the grooves accounts for most of the bait's particularly natural-like action.

It is, therefore, a principal object of the present invention to provide an artificial lure having a natural swimming motion in simulation of a small fish as it is towed or dragged through the water.

It is another object of the present invention to provide an artificial lure the top of which wiggles side to side in the water, and the tail of which wobbles side to side at one and the same time when the lure is being drawn through the water.

These and other objects and advantages of the present invention will be more fully apparent upon consideration of the annexed drawings and the following description, in which like numerals indicate like parts throughout the several views, in which:

Figure 1 is a side view in elevation of an embodiment of the present invention;

Figure 2 is a top view thereof;

Figure 3 is a front view, and

Figure 4 is a sectional view of another embodiment of the present invention with the attaching eye moved to the top of the body and without the spoon attached to the lower part of the body.

Referring in detail to the drawings, the illustrated device comprises a body 10 having a head portion 11 and a tail portion 12, with upstanding sides 13 along the body 10 and extending upwardly from the ventral half of the head portion. A thin vertical tail 14 is formed on the tail portion 12. The sides 13 converge rearwardly to a thin tail edge 15. Joining the forward ends of the sides 13 is a flat declining face 16 which has its lower end 17 rounded.

Longitudinal grooves 18 are cut into the body 10 where the sides 13 meet with a rounded or convexly curved upper or dorsal surface 19. The grooves 18 meet at their forward ends 18' across the upper part of the face 16 of the head portion 11 and extend straight and continuously along the sides of the body and open at their rear ends through the tail edge 15. The lower surface or portion of body 10 is likewise rounded or convexly curved and is designated the ventral surface 20.

A spoon 21 is secured to the body 10 by screws 22 to the ventral surface 20 and has provision for attaching the hook 24. A screw eye 25 is secured to the lower end 17 of face 16, or as shown in Figure 4, to the upper end 26 of face 16.

Another screw eye 27 is secured to the tail 14 in which is swiveled a second hook 29. In the embodiment shown in Figure 4, a weight 31 is inset into the body 10, and may be painted to resemble an eye 32, as in Figure 1. The spoon 21 is shown to be omitted in Figure 4, and with the attachment of the eye 25' at the upper end 26, the spoon's contribution to the water action is to a large extent assumed by the face 16, which points somewhat more steeply downwater as the invention is returned on a cast or trolled behind a boat.

The feature that is important to the invention, whether used with the spoon 21 and with either point of attachment of the eye 25, are the grooves 18. It has been observed that water flowing upwardly and around the flat face 16 flows into and out of the grooves 18 in such a manner as to cause the bait to have a very life-like movement in the water, which is a highly natural simulation of a fast escaping live bait.

The embodiment here illustrated and described is a preferred embodiment only, and many changes and modifications may be made without departing from the spirit and scope of the invention within the terms of the appended claims.

What is claimed is:

1. In an artificial lure, an elongated body having a head portion and a tail portion terminating in a thin tail edge, said body having opposite sides, said sides converging rearwardly from said head portion to said thin tail edge, said tail edge being vertical, and line attaching means on said head portion, said body having a convex top surface and longitudinal grooves in the opposite sides of the body indenting said body adjacent to said top surface, said grooves extending continuously along the body and opening through said tail edge, said head portion having an upper end and said grooves having forward end portions extending across the upper end of the head and meeting with each other.

2. In an artificial lure, an elongated body having a head portion and a tail portion terminating in a thin tail edge, said body having opposite sides, said sides converging rearwardly from said head portion to said thin tail edge, said tail edge being vertical, and line attaching means on said head portion, said body having a convex top surface and longitudinal grooves in the opposite sides of the body indenting said body adjacent to said top surface, said grooves extending continuously along the body and opening through said tail edge, said head portion having an upper end, said grooves having forward end portion extending across the upper end of the head and meeting with each other, and said line attaching means being located on and projecting above said head portion.

3. In an artificial lure, an elongated body having a head portion having an upper end, a tail portion terminating in a thin tail edge, said body having opposite side surfaces reaching from said head portion to said tail edge, said body having a transversely convexed top surface extending between said side surfaces and between the upper end of the head portion and said tail edge, said opposite side surfaces of the body having upper boundaries and said top surface having side boundaries meeting the upper boundaries of the side surfaces, said body having a single longitudinal groove extending along the meeting boundaries of the side surfaces and the top surface at each side of the body, each of said grooves being continuous and reaching from the tail edge to the upper end of the head portion, and said grooves having forward end portions extending to the upper end of the head portion and joining in the upper end of the head portion.

References Cited in the file of this patent

UNITED STATES PATENTS

| | | | |
|---|---|---|---|
| D. 162,696 | Stauffer | Mar. 27, | 1951 |
| 1,268,635 | Shuff | June 4, | 1918 |
| 1,869,111 | McLaughlin | July 26, | 1932 |
| 1,948,005 | Pflueger | Feb. 20, | 1934 |
| 2,036,075 | Peterson | Mar. 31, | 1936 |
| 2,217,789 | Bobo | Oct. 15, | 1940 |
| 2,241,767 | Cullerton | May 13, | 1941 |